(12) United States Patent
Fourguette et al.

(10) Patent No.: US 11,415,700 B2
(45) Date of Patent: Aug. 16, 2022

(54) MULTI-ELEMENT FABRY-PEROT ETALON INTERFEROMETER FOR DIRECT DETECTION LIDAR

(71) Applicant: MICHIGAN AEROSPACE CORPORATION, Ann Arbor, MI (US)

(72) Inventors: Dominique Fourguette, Stevenson Beach, CA (US); David Zuk, Dexter, MI (US)

(73) Assignee: MICHIGAN AEROSPACE CORPORATION, Ypsilanti, MI (US)

( * ) Notice: Subject to any disclaimer, the term of this patent is extended or adjusted under 35 U.S.C. 154(b) by 910 days.

(21) Appl. No.: 16/079,053

(22) PCT Filed: Feb. 9, 2017

(86) PCT No.: PCT/US2017/017198
§ 371 (c)(1),
(2) Date: Aug. 22, 2018

(87) PCT Pub. No.: WO2017/146913
PCT Pub. Date: Aug. 31, 2017

(65) Prior Publication Data
US 2019/0369259 A1 Dec. 5, 2019

Related U.S. Application Data

(60) Provisional application No. 62/300,296, filed on Feb. 26, 2016.

(51) Int. Cl.
*G01S 17/95* (2006.01)
*G01S 7/481* (2006.01)
*G01S 17/58* (2006.01)

(52) U.S. Cl.
CPC ............ *G01S 17/95* (2013.01); *G01S 7/4816* (2013.01); *G01S 7/4818* (2013.01); *G01S 17/58* (2013.01)

(58) Field of Classification Search
None
See application file for complete search history.

(56) References Cited

U.S. PATENT DOCUMENTS 5,216,477 A  6/1993  Korb
5,666,195 A  9/1997  Shultz et al.
(Continued)

OTHER PUBLICATIONS

Extended European Search Report in corresponding application EP 17 75 6988.6, dated Sep. 2, 2019, 7 pages.
(Continued)

*Primary Examiner* — Yuqing Xiao
*Assistant Examiner* — Benjamin Richard Hebert
(74) *Attorney, Agent, or Firm* — Juan Carlos A. Marquez; Marquez IP Law Office, PLLC

(57) ABSTRACT

A number of etalons together are used to extract the velocity, density and temperature of a scattering medium, such as the atmosphere. An optical air data sensor system incorporates the structure and operation for outputting laser light at a volume of air so as to be scattered by molecules and aerosols in the air volume being scanned; receiving the scattered laser light via a collecting optics assembly; splitting the received scattered laser light from the input optical fiber into a plurality of scattered light emissions; collimating each of the plurality of scattered light emissions; inputting the plurality of collimated light emissions into corresponding ones of a plurality of Fabry-Perot etalons; and imaging each of the plurality of collimated light emissions from the plurality of Fabry-Perot onto corresponding ones of a plurality of non-imaging detectors.

6 Claims, 11 Drawing Sheets

(56) References Cited

U.S. PATENT DOCUMENTS

| | | |
|---|---|---|
| 6,163,380 A | 12/2000 | Hays |
| 2004/0239913 A1* | 12/2004 | Kobayashi .............. G01S 17/95 356/4.01 |
| 2008/0049228 A1* | 2/2008 | Chan ........................ G01J 3/26 356/450 |
| 2011/0075142 A1* | 3/2011 | Maity ....................... G01J 3/02 356/326 |
| 2011/0164783 A1 | 7/2011 | Hays et al. |
| 2012/0169053 A1 | 7/2012 | Tchoryk et al. |
| 2012/0182555 A1* | 7/2012 | Statz ........................ G01J 3/26 356/437 |
| 2015/0233962 A1 | 8/2015 | Hays et al. |
| 2018/0216995 A1* | 8/2018 | Qian ..................... G01J 1/4257 |

OTHER PUBLICATIONS

PCT International Search Report in corresponding application PCT/US2017/017198, dated May 22, 2017, 2 pages.

\* cited by examiner

MULTI-ELEMENT FABRY-PEROT ETALON INTERFEROMETER FOR DIRECT DETECTION LIDAR

This application claims priority to U.S. Provisional Application No. 62/300,296 filed on Feb. 26, 2016, the entire contents of which are hereby incorporated by reference.

I. BACKGROUND OF INVENTION

A. Scope of the Invention

The invention described herein uses a number of etalons to extract the velocity, density and temperature of the scattering medium.

B. Summary of the Prior Art

LIDAR systems are often separated into two categories based on the detection method used. One method uses coherent or heterodyne detection while the second uses direct detection. It is the direct detection that is of interest in this case. Some direct detection LIDAR systems measure the line of sight velocity, density and or temperature of the scattering medium which is often the earth's atmosphere. A subset of those systems employs a Fabry-Perot interferometer that uses an etalon in the signal chain.

II. SUMMARY OF THE INVENTION

Multiple etalon LIDAR systems have been employed before to separately measure the aerosol and molecular components of the scattered energy. These dual etalon systems use etalons that have significantly different resolution and hence free spectral ranges. These systems require two very sensitive, heavy, power hungry and expensive cameras to collect the fringe images and significant computing power to convert the fringe patterns from the etalons into velocity information.

If one uses multiple etalons that are tuned so that their free spectral ranges are nearly equal, and are centered at slightly different frequencies or wavelengths, these multiple etalon systems do not require an imaging detector, and therefore the LIDAR does not require an imaging detector and its associated limitations.

Michigan Aerospace Corporation, MAC, has previously patented a Molecular Optical Air Data System (U.S. Pat. No. 7,106,447) and CIP patents named Optical Air Data System (U.S. Pat. No. 7,495,774 7,505,145 7,508,528 7,518,736 and 7,522,291). These patents all use a Fabry-Perot etalon and an imaging detector to produce an optical air data package consisting of density, temperature, true air speed, vertical speed, sideslip, and angle of attack.

III. BRIEF DESCRIPTION OF THE DRAWINGS

The present invention is illustrated in the accompanying drawings, wherein.

IV. DESCRIPTION OF THE PREFERRED EMBODIMENT

Figure 1:
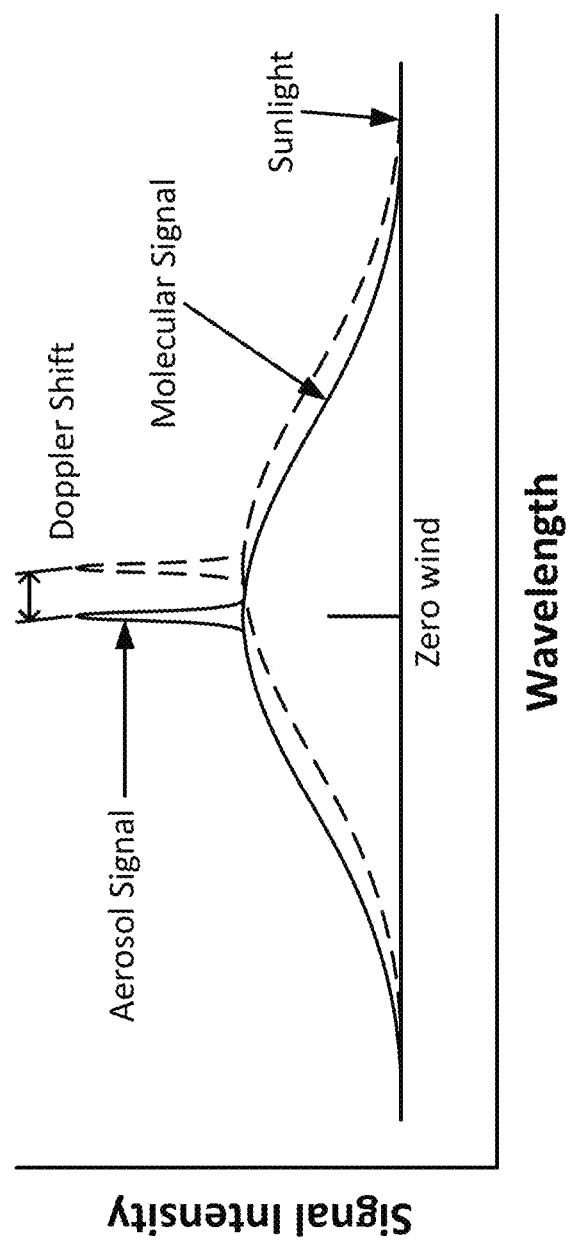
FIG. 1 illustrates an atmospheric parameter extraction, wherein the reference fringe is shown in black according to the present invention.

The embodiments of the present invention will be described hereinbelow in conjunction with the above-described drawings. The direct detection method uses a Fabry-Perot (F-P) interferometer receiver that creates constructive and destructive ring patterns, or fringes. The recorded spectrum is a composite of the aerosol, molecular and background continuum. An amplitude profile of a single fringe is shown in FIG. 1. The phase, or center, of the spectrum is measured relative to a reference to deduce the Doppler shift of the signal; this is used to determine the line-of-sight wind speed and direction. The amplitude of the molecular signal is proportional to the number of molecules that scatter light and therefore is proportional to atmospheric density. Through analysis, these components are separated to form the measurements listed in Table A hereinbelow.

The spectra illustrated in FIG. 1 are a sum of the aerosol and molecular components. The actual fringe pattern after going through the etalon is the convolution of the summed aerosol and molecular components and the etalon's response.

Figure 2:
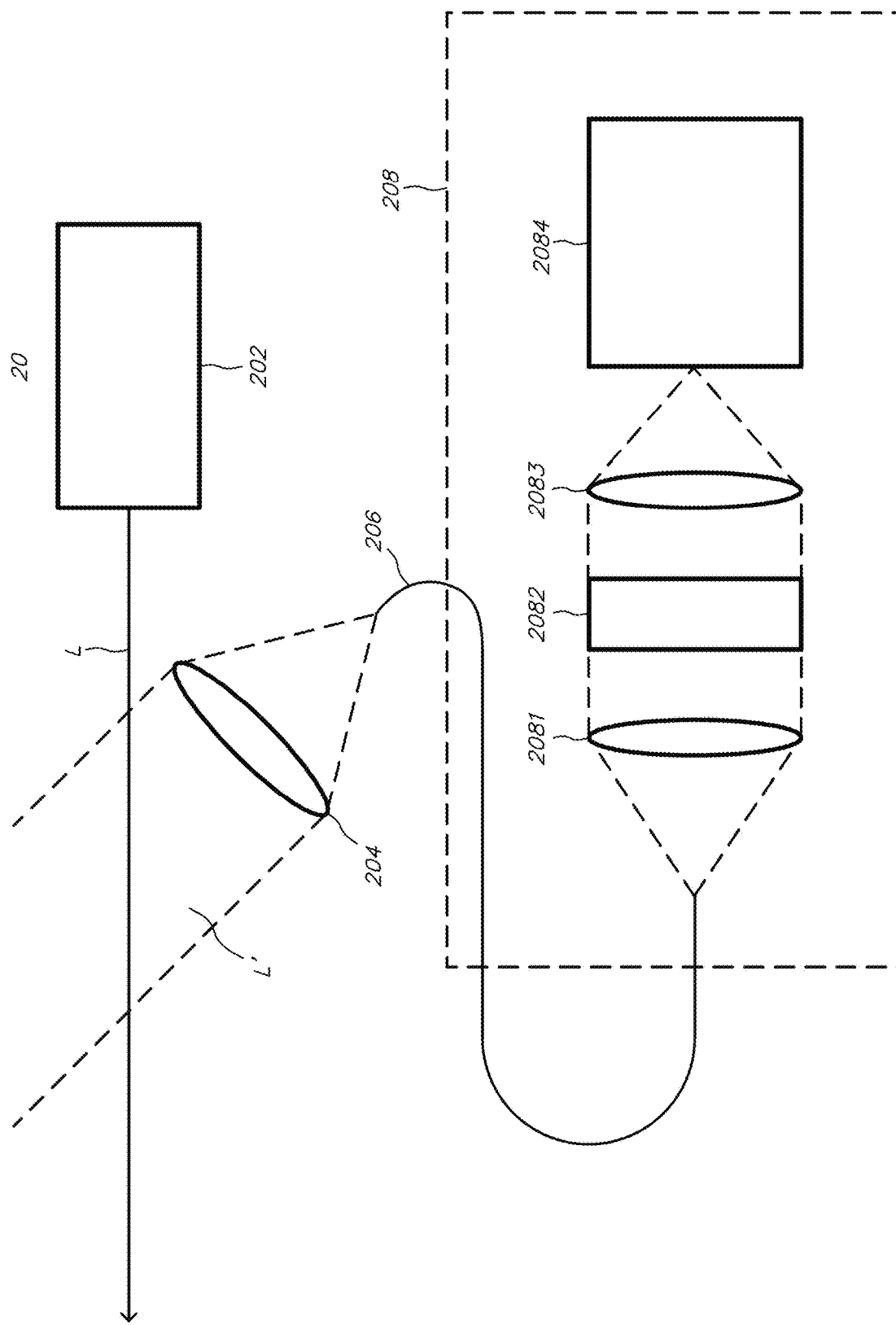
FIG. 2 shows a functional diagram of the molecular velocity sensor according to the present invention.

FIG. 2 shows the components comprising the Optical Air Data System (OADS) sensor 20 for operation in the atmosphere. In general, the OADS sensor incorporates a laser 202, collecting optics assembly 204, optical fiber 206, and a F-P interferometer 208. Light L emitted from the laser 202 is scattered by molecules and aerosols in the area of the atmosphere being scanned. The laser scattered light L' from the molecules and aerosols is collected using the collecting optics assembly 204 designed to send the light through the optical fiber 206. The light is then passed through the F-P interferometer 208. In general, the F-P interferometer incorporates a collimating lens 2081, an etalon 2082 and an imaging lens 2083 that together receive the light from the optical fiber and generate a fringe pattern. The fringe pattern is outputted from the imaging lens 2083 and imaged onto an imaging detector such as a CCD array 2084 for processing.

TABLE A

| Parameter | Atmospheric Phenomenon | Effect on scattered signal | Effect on Etalon output |
|---|---|---|---|
| Air speed | Change in air/wind speed | Wavelength of return shifts due to Doppler | "Fringe" radii shift in or out |
| Density | Density of air mass increases or decreases | Scattering of laser increases or decreases | Area under the "fringe" increases or decreases |
| Temperature | Doppler Broadening with Temperature | Increases the Width of The Molecular Signal | Increased Fringe Width |

The multiple etalon configuration 30 of the present invention offers the potential for making the system smaller, more energy efficient, less expensive, and an increased data rate that may be critical in some control situations and in some other applications would result in reduced range-bin size and hence better range resolution. In this invention, ideally each of the etalons is effectively a bandpass filter with different center frequency but the same bandwidth.

Figure 3:
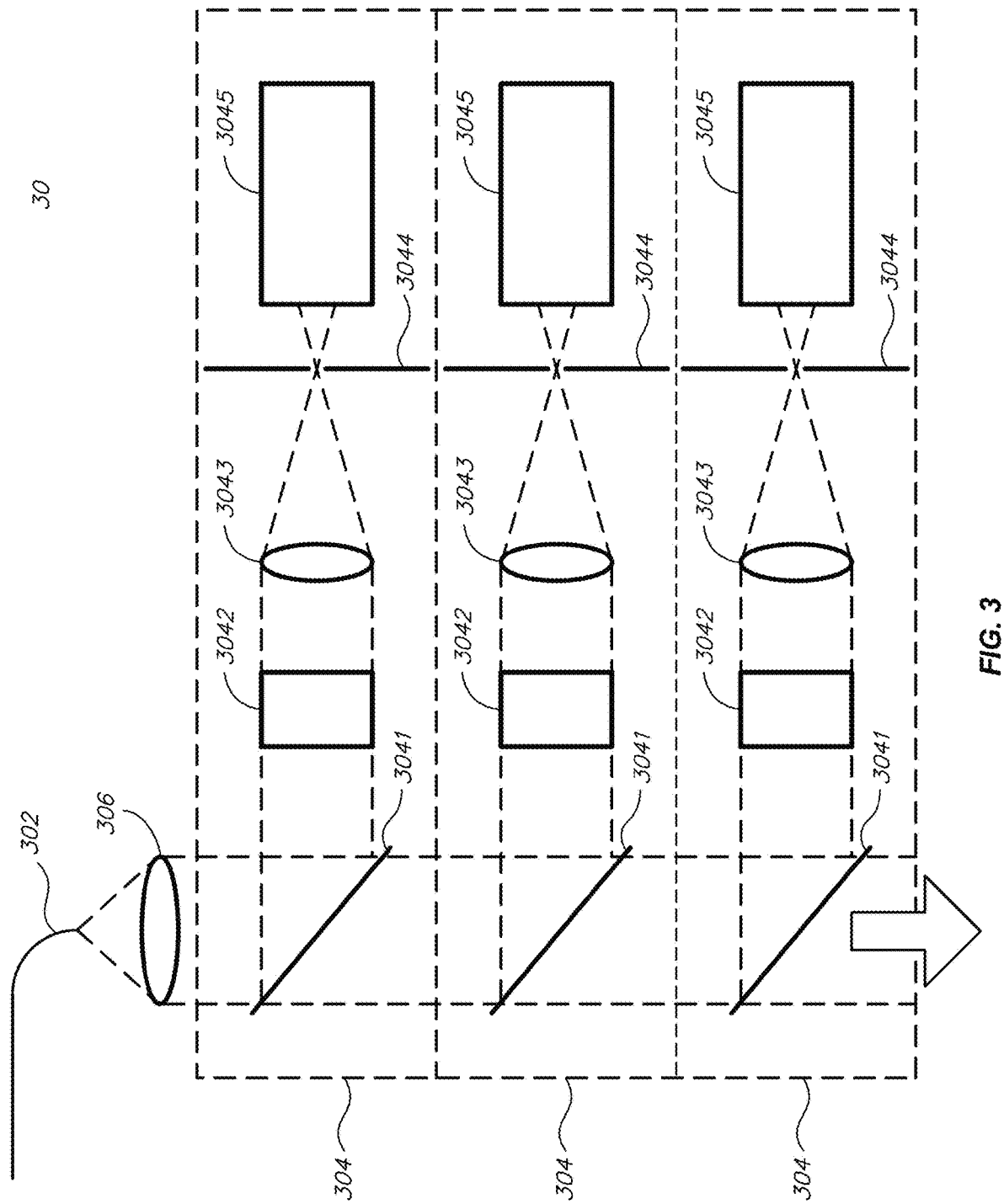
FIG. 3 shows a preferred embodiment of the molecular velocity sensor according to the present invention.

As shown in FIG. 3, as compared to the OADS sensor in FIG. 2, the multiple etalon configuration 30 of the present invention incorporates at least an input fiber 302 that receives laser light scattered by molecules and aerosols in the atmosphere being scanned (the laser light source not being shown). In the present invention, the Fabry-Perot interferometer and the CCD array will be replaced by an array of etalon assemblies 304, each assembly including a beam splitter 3041, an etalon 3042, an imaging lens 3043, a mask 3044 and a non-imaging detector 3045. The collecting lens assembly (not shown) that collects the scattered light and inputs into the input fiber 302 could be as simple as a single lens, or be a very sophisticated telescope depending upon the system requirements. In the embodiment shown in FIG. 3, the collected light is routed from the input fiber 302 and through a collimating lens 306 to the etalon assemblies 304. The collected light could also be inputted directly into the etalon assemblies 304 depending upon the design constraints of the particular LIDAR under consideration. Depending upon the operational constraints of the LIDAR, there may or may not be bandpass filters (not shown) in the light path before the light is routed to the etalon assemblies 304. The bandpass filters would be used to reduce the background illumination if necessary. Operation in the solar blind region of the spectrum would not require the background suppression filter.

Figure 4:
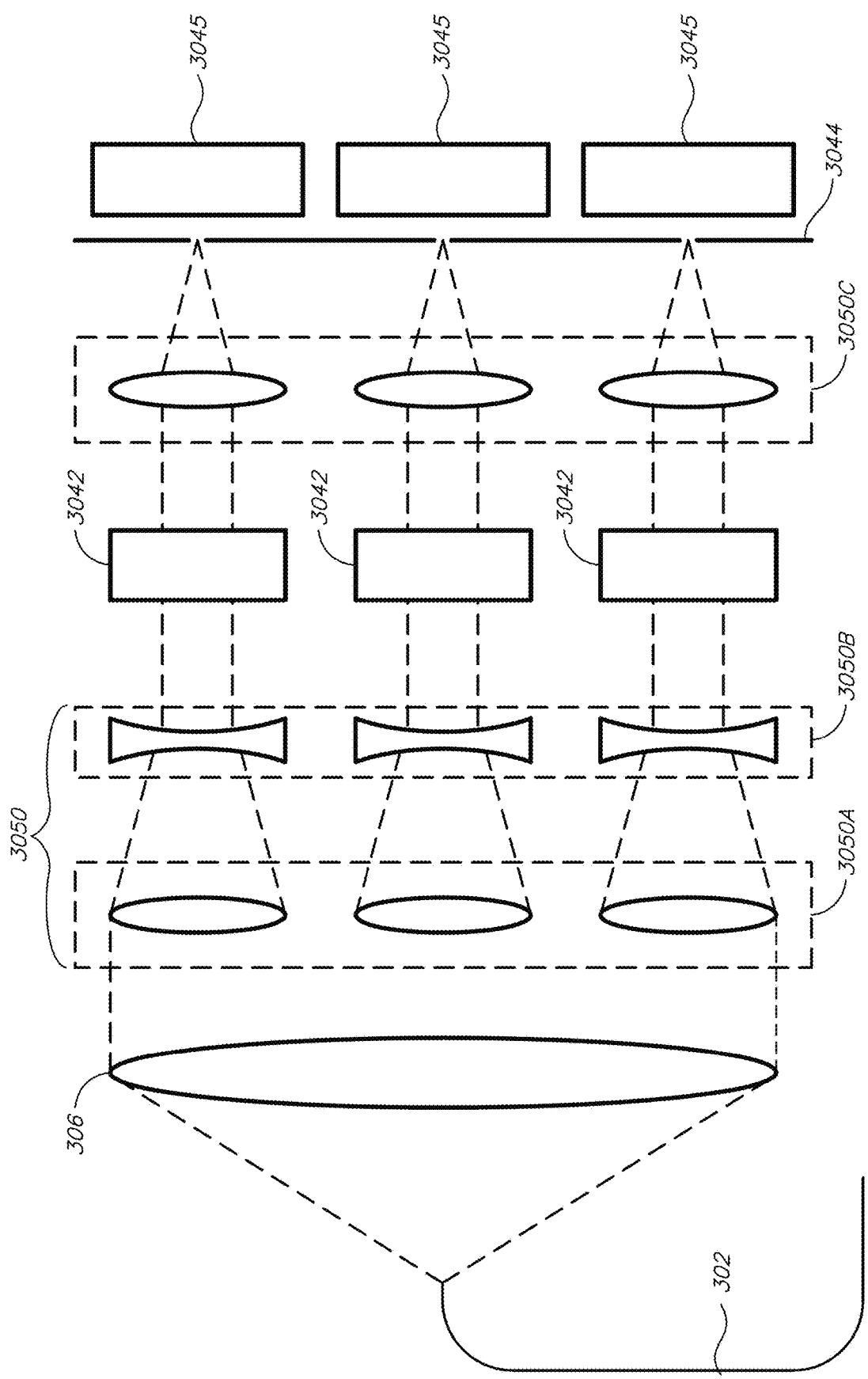
FIG. 4 shows an alternate preferred embodiment of the molecular velocity sensor according to the present invention.

Each etalon assembly 304 consists of beam splitter optics 3041, a Fabry-Perot etalon 3042, an imaging lens 3043, a mask 3044 and a nonimaging detector 3045 as illustrated in FIG. 3. In this configuration, the light inputted from the input fiber 302 would be split between multiple interferometers. In the preferred embodiment, a single collimated beam inputted from the input fiber 302 passes through the collimating lens 306 and is then split by the beam splitter optics 3041 so that a portion of the collimated beam would be directed at each of the multiple etalons 3042 as shown in FIG. 3. In at least one embodiment, the beam splitter optics 3041 consists of a combination of a multi-lens arrays 3050 suitable to distribute the collimated light to all etalons 3042, as shown in FIG. 4. The multi-lens array 3050 includes the same number of lenses as the number of Fabry-Perot etalons 3042. In at least one embodiment, an array of converging microlenses 3050A converges the light onto an array of diverging microlenses 3050B to collimate the light onto the individual Fabry-Perot etalons 3042. The combination of the converging and diverging lenses before the etalons 3042 reduces the diameter of the light beam striking the etalons 3042. The reduced beam size provides for not using the edges of the etalons 3042 as it is difficult to polish the etalons to the edge.

The output of each etalon 3042 is then imaged through the imaging lens 3050C onto the mask 3044 where only a portion of the spectrum outputted from the etalon 3042 is inputted onto the detector 3045. The detector 3045 would not have to be an imaging detector as is used in some direct detection LIDARs. The imaging lens 3050C converts the output of the etalon 3042 into a fringe pattern focused at the mask 3044. The mask 3044 may be implemented using a thin metal sheet with holes that define the mask 3044 or a glass plate or other transparent optical material that is coated with preferably a non-reflecting coating that has the coating deposited on the optical material in the pattern of the mask. The preferred shape of the holes in the mask is a circle. The detector 3045 may be implemented using a photo multiplier (PMT) an array of photo multipliers, or other photo detector such as a CMOS detector, instead of an imaging detector as used in the prior art. PMTs, PMT arrays and CMOS detectors afford the advantage of being able to gate the spectrum received by the detector 3045, thereby providing the ability to select a range bin.

In the preferred embodiment, each etalon 3042 has a slightly different gap so that each interferometer would have a slightly different center frequency as will be illustrated in the following discussion. While the embodiment shown in the drawings implements a two-dimensional structure, the etalons 3042 may be arranged in a three-dimensional matrix (not shown) in order to maximize the amount of light collected by the collimating lens 306. The etalons 3042 may also be either solid- or air gapped-type depending on system constraints.

Figure 5:
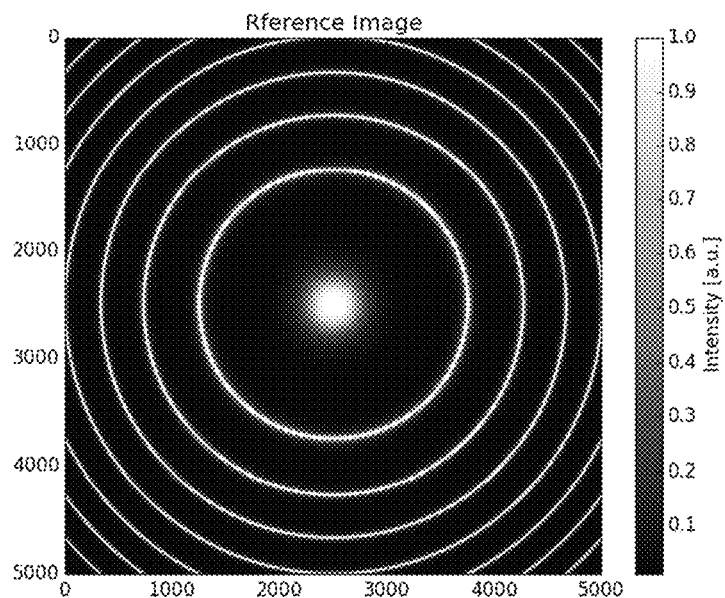
FIG. 5 illustrates a simulation of a Fabry-Perot interferometer output according to the present invention.
Figure 6:
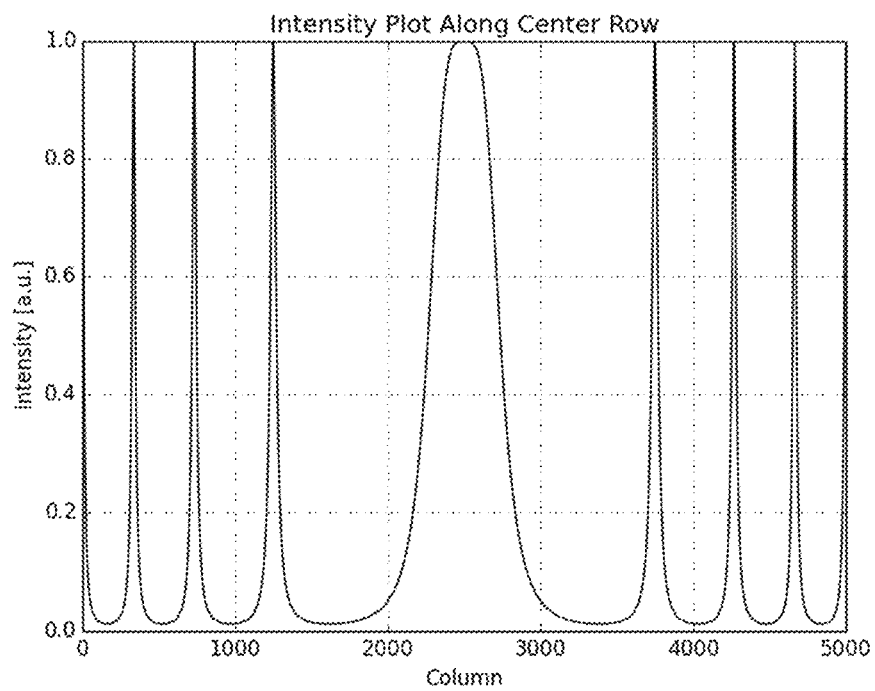
FIG. 6 shows an intensity profile across a Fabry-Perot etalon according to the present invention.

To better understand the concept, we consider a single etalon interferometer. FIG. 5 is a simulation of an image produced by a Fabry Perot interferometer. If one were to take a plot of the intensity profile through the center row, the results would appear as shown in FIG. 6. The peak intensity for each peak is the same and note that the response does not go all the way down to zero.

Figure 7:
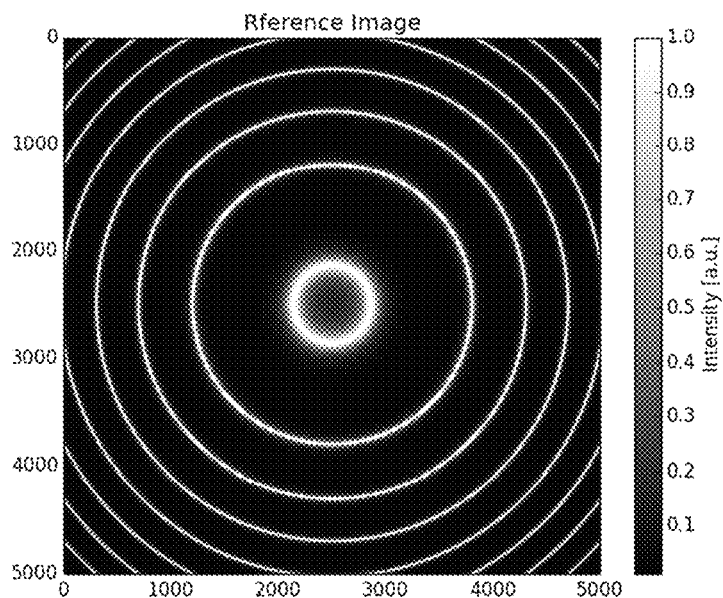
FIG. 7 illustrates an F-P output with the laser line changed according to the present invention.
Figure 8:
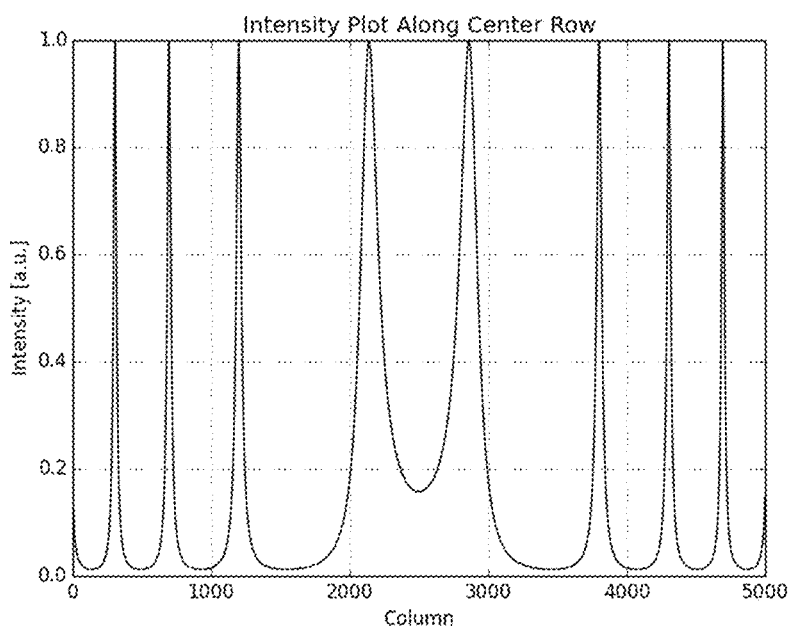
FIG. 8 illustrates an intensity pattern across the F-P interferometer according to the present invention.

If one were to change the frequency of the laser, by a small amount, the Fabry Perot image would change as shown in FIG. 7. As shown, the bright spot in the center has become a ring and all the rings are now farther apart. Again, plotting the intensity through the center illustrates the change in fringe position and is presented in FIG. 8.

Figure 9:
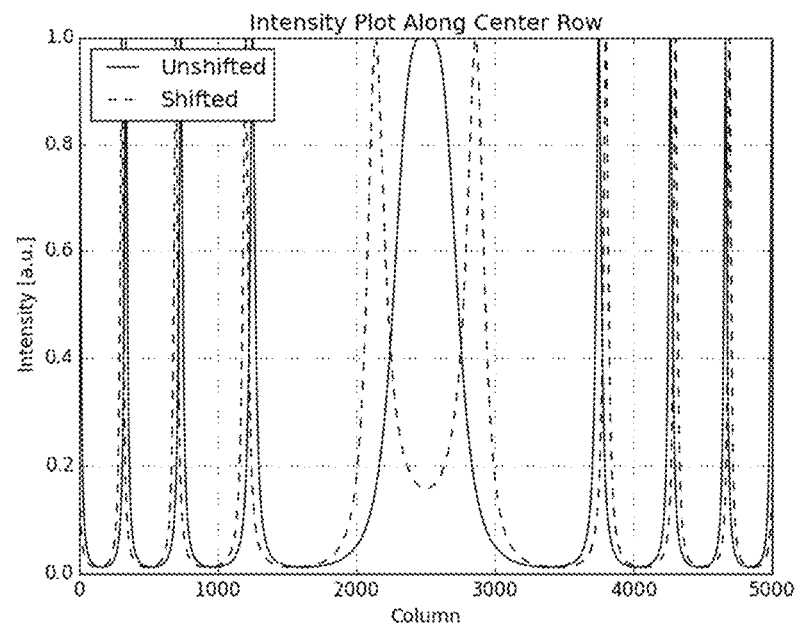
FIG. 9 illustrates an intensity plot along the center row according to the present invention.

FIG. 9, shows the frequency shifted and unshifted intensity plots on the same grid. Notice that the separation between the peaks is smaller as the columns are further from the center. It is clear that the peaks have a nonlinear spacing.

If one changes the abscissa to a non-linear in this case a radius squared from the interference pattern center, the intensity spikes will be periodic.

Figure 10:
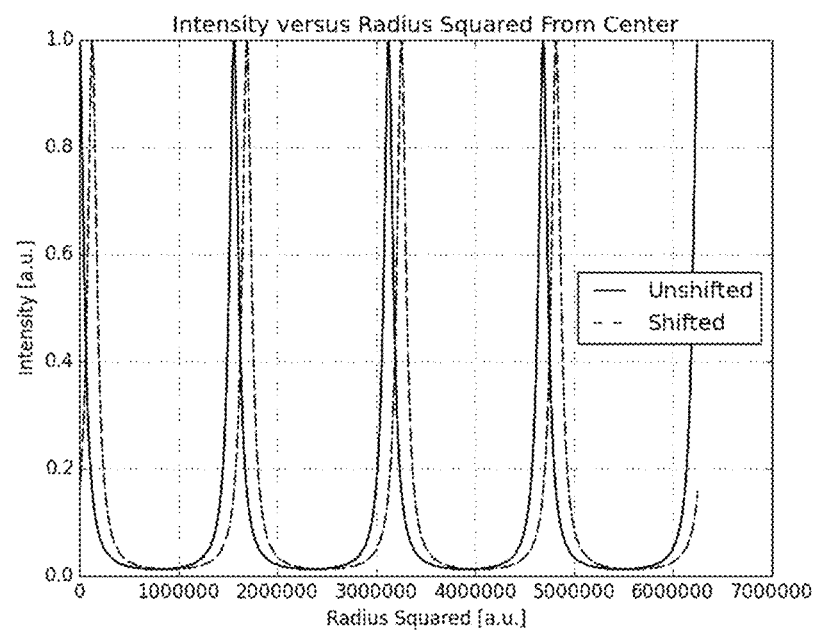
FIG. 10 illustrates an intensity plot versus the radius squared according to the present invention.

In FIG. 10, the abscissa is the square of the radius from the center of the interference pattern. As discussed earlier, the peaks are periodic as one would expect. It should be pointed out that the observed response shown in FIGS. 7-10 is for a single frequency or wavelength of light. Each of the intensity spikes is the same frequency. However, if the frequency were to change enough, the two intensity patterns would be indistinguishable. The amount of frequency change required to produce this overlap is called the Free Spectral Range of the etalon.

The Free Spectral Range, FSR, can be calculated by using the formula FSR=1/(2*n*h) where n is the index of refraction of the material in the etalon gap and h is the spacing. (If the spacing is given in centimeters, then the FSR is given in $cm^{-1}$ or inverse centimeters. To convert the FSR to GHz, simply multiply the FSR in $cm^{-1}$ by the speed of light in cm or approximately $3.0 \times 10^{10}$ cm/s or 30 GHz*cm.)

Figure 11:
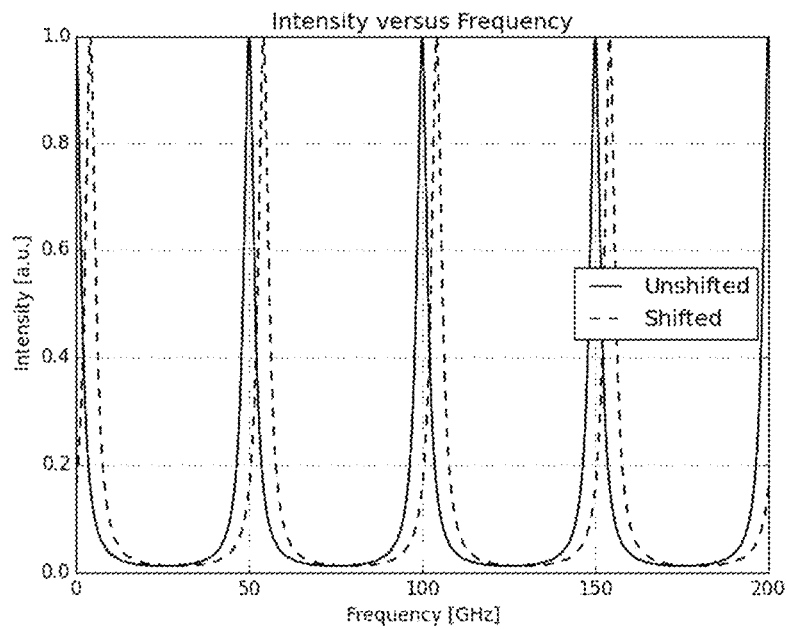
FIG. 11 illustrates an intensity plot versus frequency shift according to the present invention.

In FIG. 10, it is possible to change from the "arbitrary units" used for the radius that was left over from the generation of the fringe images to frequency or FSRs also called orders. FIG. 11, has the radius squared replaced with a frequency based on the FSR.

The frequency in the previous plot is actually a frequency difference from the center fringe. However, one must consider that the frequency is modulo the FSR which in this case is approximately 50 GHz. That is each of the adjacent peaks of either the shifted or unshifted have a spacing of 50 GHz. If the center frequency is changed by 50 GHz, one could not tell the difference, as the pattern would be identical. Because the response in periodic in frequency, one must limit frequency changes to less than one half a FSR (or, in this case, ±25 GHz) if one needs to have an unambiguous measurement.

Figure 12:
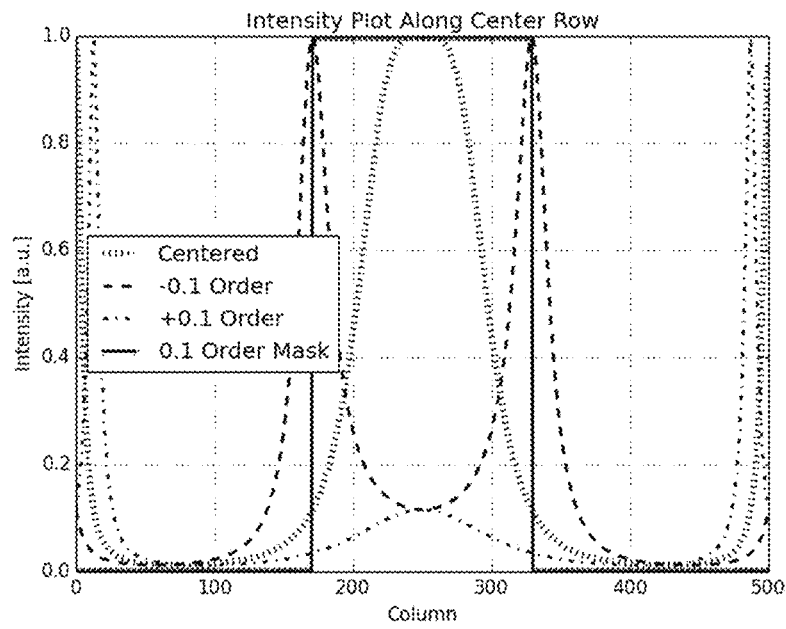
FIG. 12 illustrates the intensity profile through the center of the fringe pattern according to the present invention

As noted above, a single etalon was considered, and the resulting interference pattern was projected onto a CCD and the fringe image was analyzed. The main issue with this approach is the readout rate of the imager used to convert the spatial information into a velocity estimate. It takes quite a bit of time to read out the entire frame, and a higher update rate is preferred in many applications. To increase the readout rate for those applications, the approach in the present invention is to use multiple etalons to sample the return beam and use only the central portion of the interference pattern. The central portion of the interference pattern would be defined by a mask, and the light that passed through the mask would be incident upon a single detector. The readout rate or bandwidth of these detectors could be in the Gigahertz range. FIG. 12 illustrates the intensity profile through the center of the fringe pattern, for the unshifted laser frequency and the frequency shifted+0.1 and −0.1 order.

In the preferred embodiment of the present invention, it should be noted that only the central portion of the fringe pattern need be illuminated. Illumination outside the mask will be blocked, such that only the portion of the fringe pattern of interest need be illuminated, thereby allowing some margin for manufacturing tolerances.

In the preferred embodiment, as an example, a set of 10 etalons each tuned to a slightly different wavelength or frequency is used. The optimum number of etalons will depend upon the LIDAR system requirements and is subject to trades that are part of the design of any LIDAR sensor. Further, while equal spacing is illustrated, manufacturing tolerances will result in slightly different spacing than desired, but the impact of imperfect spacing is stationary and can be accounted for in a calibration procedure.

Figure 13:
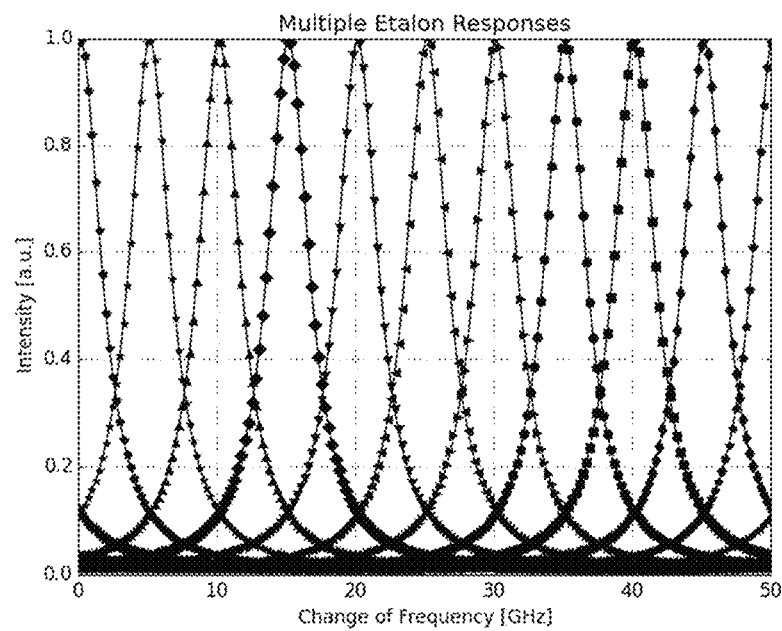
FIG. 13 illustrates a change of resonance frequency from a multiple etalon according to the present invention.
Figure 14:
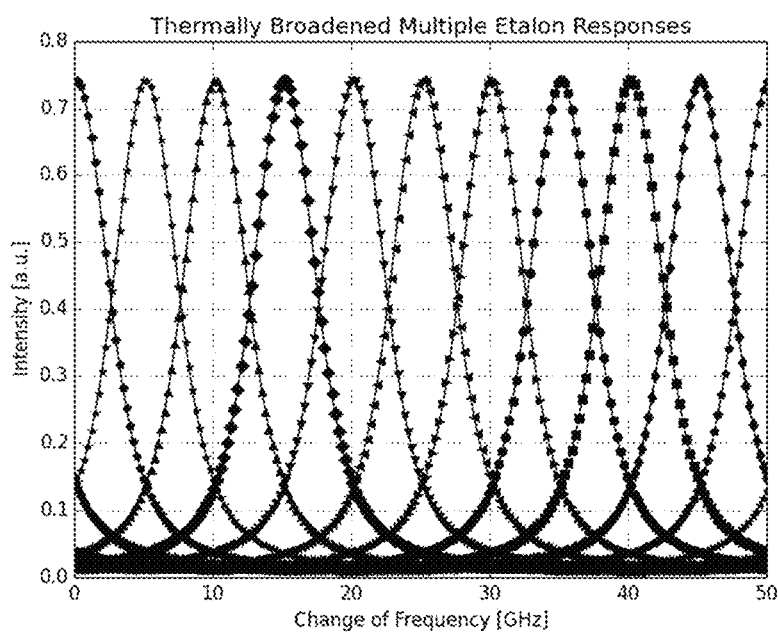
FIG. 14 illustrates a change of frequency from a thermally broadened etalon according to the present invention.

The responses of 10 etalons each "tuned" to a different frequency are presented on the same axes, as shown in FIG. 13. Note that each of the etalons has been assigned a different marker. From left to right, the markers are: a pentagon, star, up triangle, large diamond, down triangle, left triangle, right triangle, circle, square, and a small diamond. Notice that in FIG. 13 the response wraps around the FSR of 50 GHz. FIG. 14 shows what one would obtain if one tuned a laser over the FSR and observed the output at the very center of the interference pattern of each etalon separately. The end result is effectively a filter bank where each etalon is basically a bandpass filter.

In the case where the laser lines are thermally broadened, as occurs when coherent light reflected from a moving atmosphere, then the responses would be slightly wider as shown in FIG. 14.

Figure 15:
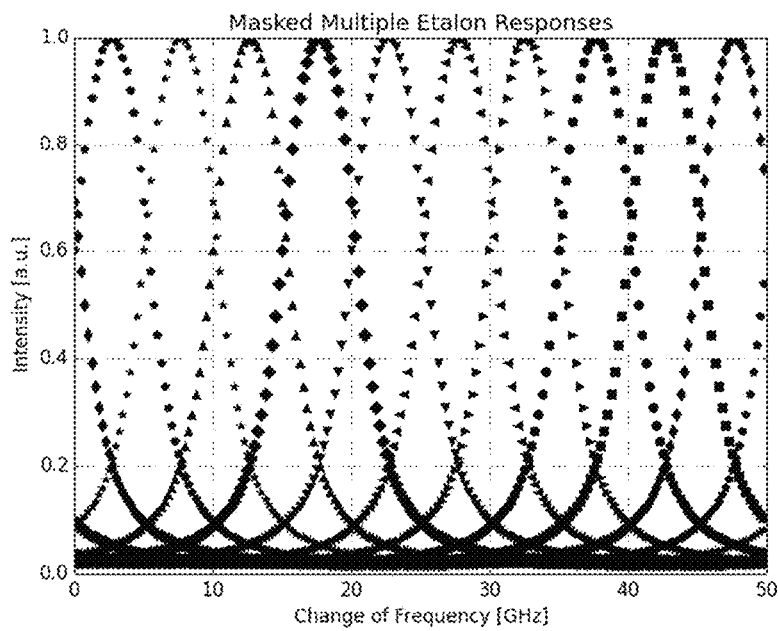
FIG. 15 illustrates an intensity response from masked etalons according to the present invention.

In considering the case where instead of just the center of the interference pattern, a circle centered about the center of the interference pattern is used. All the energy within the circle is integrated to produce a single measurement. FIG. 15 illustrates the effect of applying masks to the response. The position of the peak has shifted slightly; this shift is because the blurring kernel is not symmetric as there are no negative radii possible. The shift is the average radii of the circular mask.

Figure 16:
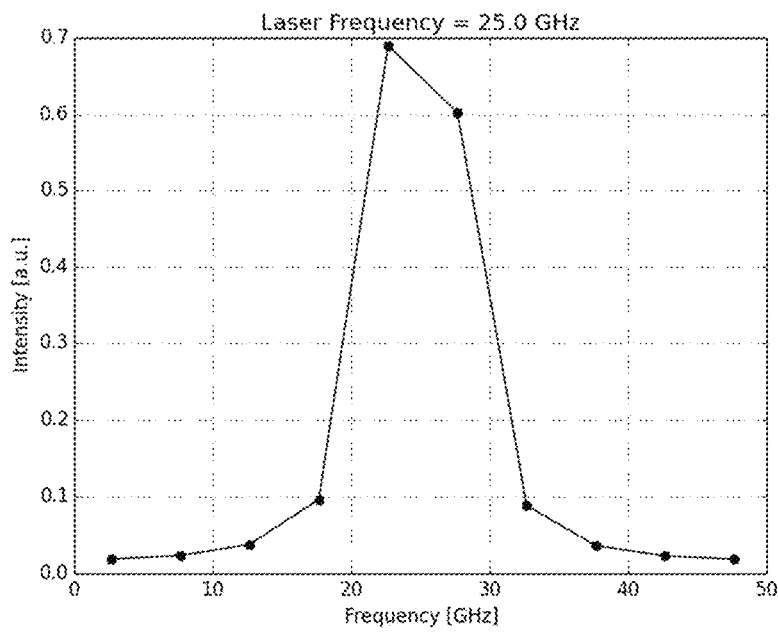
FIG. 16 shows a response of the etalon array to a laser frequency according to the present invention.
Figure 17:
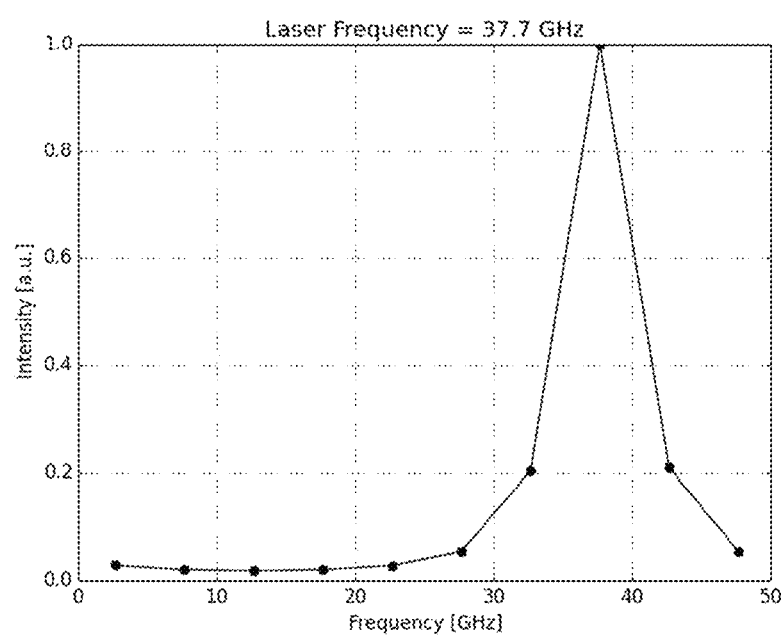
FIG. 17 illustrates a response of the etalon array to a laser frequency when the laser line is aligned with one of the etalons according to the present invention.

To determine the response from each etalon for a particular laser frequency, all one has to do is locate the desired frequency and look at the signal levels for each of the etalons at that frequency. A plot for a frequency of 25 GHz is presented in FIG. 16. FIG. 17 shows the response when the laser is aligned with the peak signal level from the etalon.

The signal processing employed to extract information from the combined measurements exploits the diversity in free spectral ranges in order to recover the signal of interest. It uses the collection of diverse responses with varied dynamics to jointly discern the underlying signal that is shared among all of them.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims, unless they depart therefrom.

We claim:

1. An optical air data sensor system, comprising:
   a laser source for outputting laser light to be scattered by molecules and aerosols in the atmosphere being scanned;
   a collecting optics assembly for receiving the scattered laser light including an input optical fiber; and
   an interferometer including collimating optics configured to collimate inputted scattered laser light from the input optical fiber into a collimated light emission, at least three beam splitters operatively positioned to split the collimated light emission into at least three collimated light emissions, at least three Fabry-Perot etalons each operatively configured to receive a corresponding one of the at least three collimated light emissions, and at least three imaging optics operatively configured to receive a corresponding one of plurality of collimated light emissions from the at least three Fabry-Perot etalons and to image the plurality of collimated light emissions onto corresponding ones of at least three non-imaging detectors.

2. An optical air data sensor system according to claim 1, wherein each of the at least three Fabry-Perot etalons is configured with a center frequency different from center frequencies of all others of the plurality of Fabry-Perot etalons.

3. An optical air data sensor system according to claim 1, wherein the interferometer further includes collimating optics configured to collimate the inputted scattered laser light from the input optical fiber into a collimated light emission, at least ten beam splitters operatively positioned to split the collimated light emission into at least ten collimated light emissions, at least ten Fabry-Perot etalons each operatively configured to receive a corresponding one of the at least ten collimated light emissions, and a plurality of imaging optics operatively configured to receive a corresponding one of plurality of collimated light emissions from the at least ten Fabry-Perot etalons and to image the plurality of collimated light emissions onto corresponding ones of at least ten non-imaging detectors.

4. A method for optically sensing an air volume, comprising the steps of:
providing an interferometer that includes collimating optics configured to collimate inputted scattered laser light into a collimated light emission, at least three beam splitters operatively positioned to split the collimated light emmission into a plurality of collimated light emissions, at least three Fabry-Perot etalons each operatively configured to receive the collimated light emissions, and at least three imaging optics operatively configured to receive corresponding ones of the collimated light emissions from the at least three Fabry-Perot etalons and to image the collimated light emissions onto corresponding ones of at least three non-imaging detectors;
outputting laser light at a volume of air so as to be scattered by molecules and aerosols in the air volume being scanned;
receiving the scattered laser light so as to be inputted into the interferometer;
collimating the received scattered laser light via the collimating optics into a collimated light emission;
splitting the collimated light emmission into a plurality of collimated light emissions;
in putting the plurality of collimated light emissions into corresponding ones of the at least three Fabry-Perot etalons; and
imaging each of the plurality of collimated light emissions from the at least three Fabry-Perot etalons onto corresponding ones of the at least three non-imaging detectors.

5. A method according to claim 4, further comprising the step of:
configuring each of the at least three Fabry-Perot etalons is configured with a center frequency different from center frequencies of a II others of the plurality of Fabry-Perot etalons.

6. A method according to claim 4, further comprising the steps of:
providing an interferometer that includes collimating optics configured to collimate inputted scattered laser light into a collimated light emission, at least ten beam splitters operatively positioned to split the collimated light emmission into a plurality of collimated light emissions, at least ten Fabry-Perot eta Ions each operatively configured to receive the collimated light emissions, and at least ten imaging optics operatively configured to receive corresponding ones of the collimated light emissions from the at least ten Fabry-Perot etalons and to image the collimated light emissions onto corresponding ones of at least ten non-imaging detectors;
splitting the received scattered laser light from the input optical fiber into the plurality of scattered light emissions via the at least ten beam splitters;
in putting the plurality of collimated light emissions into corresponding ones of the at least ten Fabry-Perot etalons; and
imaging each of the plurality of collimated light emissions from the at least ten Fabry-Perot etalons onto corresponding ones of the at least ten non-imaging detectors.

* * * * *